United States Patent [19]

Spensberger

[11] Patent Number: 4,610,577
[45] Date of Patent: Sep. 9, 1986

[54] GEAR OR RACK-SHAPED TOOL FOR PRECISION MACHINING OF TOOTH FLANKS PARTICULARLY OF HARDENED GEARS

[75] Inventor: Johann Spensberger, Poing, Fed. Rep. of Germany

[73] Assignee: Carl Hurth Maschinen und Zahnradfabrik GmbH & Co., Munich, Fed. Rep. of Germany

[21] Appl. No.: 664,813

[22] Filed: Oct. 25, 1984

[30] Foreign Application Priority Data

Dec. 21, 1983 [DE] Fed. Rep. of Germany ....... 3346190

[51] Int. Cl.⁴ .............................................. B23F 21/00
[52] U.S. Cl. .......................................... 407/27; 407/29
[58] Field of Search .................................... 407/20-29

[56] References Cited

U.S. PATENT DOCUMENTS

| | | | |
|---|---|---|---|
| 205,296 | 6/1878 | Peer | 407/29 |
| 707,719 | 8/1902 | Plant | 407/29 |
| 1,633,958 | 6/1927 | Schrott . | |
| 1,858,568 | 5/1932 | Wildhaber . | |
| 2,228,966 | 1/1941 | Miller | 407/27 |
| 2,351,842 | 4/1940 | Seibold . | |
| 2,646,611 | 7/1953 | Bauer | 407/29 |
| 2,986,856 | 6/1961 | Fehr . | |
| 3,157,174 | 11/1964 | Emery . | |
| 3,462,887 | 4/1966 | Hackman, Jr. . | |
| 3,505,911 | 4/1970 | Anthony et al. | 407/27 |
| 3,602,209 | 8/1971 | Bocker . | |
| 4,077,164 | 3/1978 | Peterman, Jr. . | |
| 4,175,537 | 11/1979 | Wiener . | |
| 4,182,082 | 1/1980 | Meyer . | |
| 4,237,852 | 12/1980 | Wiener et al. . | |
| 4,354,328 | 10/1982 | Ainoura . | |
| 4,475,319 | 10/1984 | Wirz . | |
| 4,476,656 | 10/1984 | Bovenkerk . | |

FOREIGN PATENT DOCUMENTS 2306780 8/1974 Fed. Rep. of Germany .
3202695 8/1983 Fed. Rep. of Germany .

Primary Examiner—Francis S. Husar
Assistant Examiner—Jerry Kearns
Attorney, Agent, or Firm—Flynn, Thiel, Boutell & Tanis

[57] ABSTRACT

A gear or rack-shaped tool for precision machining of tooth flanks of gears is provided with a coating of a hard material like diamond or cubic bornitride (CBN). In order to be able to apply this coating without any problems, the tool includes two connected halves. Each half includes a base member with teeth which project axially beyond one side of the base member every second tooth being removed. The projecting teeth of each half project into the gaps created by the teeth removed from the other half.

3 Claims, 4 Drawing Figures

GEAR OR RACK-SHAPED TOOL FOR PRECISION MACHINING OF TOOTH FLANKS PARTICULARLY OF HARDENED GEARS

FIELD OF THE INVENTION

This invention relates to a tool for precision machining of tooth flanks, particularly of hardened gears and, more particularly, to such a tool having a toothed base of metal and a coating which includes grains of a hard material, for example cubic bornitride (CBN) or diamond, on the tooth flanks of the base.

BACKGROUND OF THE INVENTION

For precision machining of tooth flanks of particularly hard gears, tools have become known in which a toothed base member is equipped with diamond grains or corns on its flanks, for example from German Offenlegungsschrift No. 23 06 780. A coating with corns of cubic bornitride (CBN) is described in German Offenlegungsschrift No. 32 02 695.

In particular, in the case of tooth systems with a small modulus, producing an even coating with the hard-material grains at times creates considerable difficulties, since a galvanic or other treatment in the narrow tooth gaps can be accomplished only with great difficulty.

Therefore, a basic purpose of the invention is to produce a gear or rack-shaped tool in which the mentioned difficulties during coating with hard-material grains are avoided.

SUMMARY OF THE INVENTION

To attain this purpose, a tool is provided which includes two halves which each include a toothed base member on which each second tooth is removed, the remaining teeth projecting axially beyond one side of the base member a distance which is approximately half of their length, wherein the base members are oppositely directed and connected to each other so as to be fixed against relative rotation, and wherein the axially projecting teeth of each tool half are disposed between the teeth of the other half. The gaps between teeth in this embodiment are approximately three times as wide on each tool half as in known tools, which permits, even in tooth systems with a small modulus, troublefree application of an even coating with the hard-material grains. In the case of a hard use of this tool, it is advantageous if the projecting teeth of each half are supported directly on the base member of the other half, and by using an adhesive or plastic filling this is possible with minimal manufacturing expense. Particularly effective is an embodiment in which the plastic or adhesive filling reaches the base region of the tooth gaps between the projecting teeth of one half and the teeth of the other half, because with this a tangential support of the projecting teeth is also achieved. One must, of course, be certain that the filling does not cover the operationally active flanks of the tooth teeth.

A gear-shaped tool which is composed of two halves for the finish working of gears is known from German Pat. No. 975 817 (which corresponds to U.S. Pat. No. 2,228,966). However, this patent deals with a shaving gear which does not have any characteristics of the invention except the division into two halves, which is carried out for entirely different reasons, namely, to facilitate resharpening.

BRIEF DESCRIPTION OF THE DRAWINGS

The invention will be described in detail hereinafter in connection with two exemplary embodiments, which are shown in four figures.

DETAILED DESCRIPTION

Figure 1:
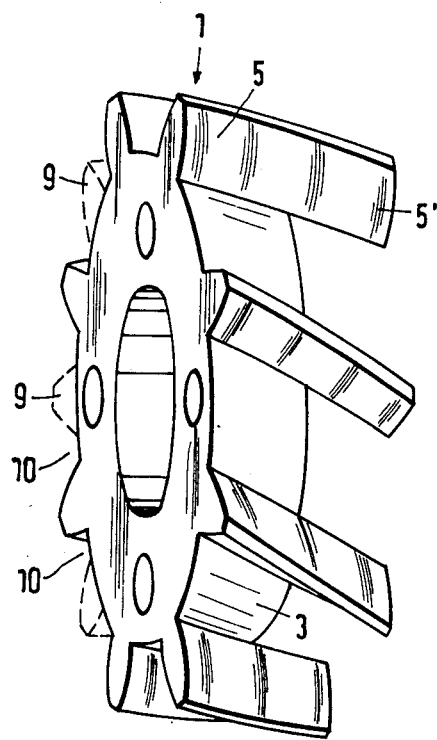
FIG. 1 is a perspective side view of one half of a tool embodying the invention.
Figure 2:
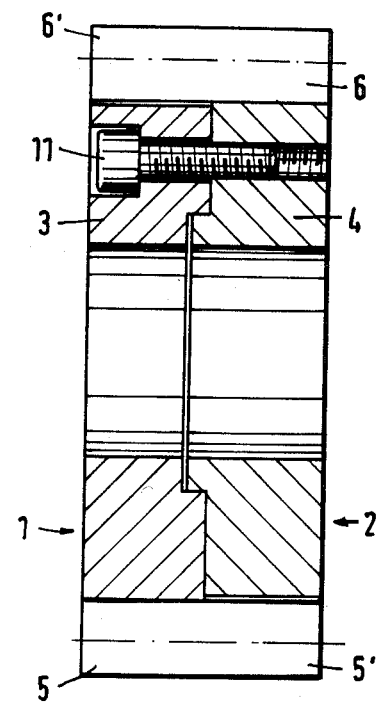
FIG. 2 is a longitudinal sectional side view of the complete tool.

The inventive tool in FIG. 2 includes two halves 1 and 2. Each half 1 and 2 has a respective disk-shaped base member 3 or 4 which is provided with circumferentially spaced teeth 5 or 6 about its periphery. These teeth each project on one side axially beyond the base member 3 or 4, namely, sufficiently far so that the projecting portions 5' and 6' have an axial length which is approximately equal to the width of the base members 3 and 4. (If, in cases of exception, the base members have different widths, then the projecting length of teeth on one half is to correspond with the width of the base member of the other half.) The teeth 5 and 6 are produced by a conventional method and have a pair of oppositely circumferentially facing involute tooth flanks separated at the radial extremities by a land surface, and subsequently each second tooth on each base member is removed. Some of the removed teeth 9 are indicated in FIG. 1 with dashed lines. The remaining teeth 5 and 6 carry a coating of grains 8 of a hard material, for example cubic bornitride (CBN) or diamond, the coating being applied with a conventional method, for example galvanically. The wide tooth gap 10 created by the removal of each second tooth 9 facilitates a troublefree application of the coating in a manner so that its thickness and structure is even.

The two halves 1 and 2 are then put together so as to be mirror-inverted with respect to one another, whereby the projecting sections 5' of the teeth 5 of the half 1 each lie between two teeth 6 of the half 2. Screws 11 or other suitable fasteners hold together the two halves 1 and 2 so that they are fixed against relative rotation. Earlier, of course, the halves 1 and 2 had to be aligned with one another, in order to have all over the same tooth width dimension.

Figure 3:
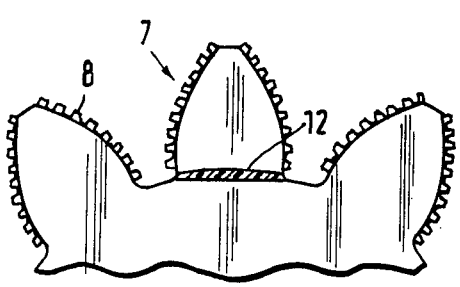
FIG. 3 is a fragmentary side view of the tool of FIG. 2.
Figure 4:
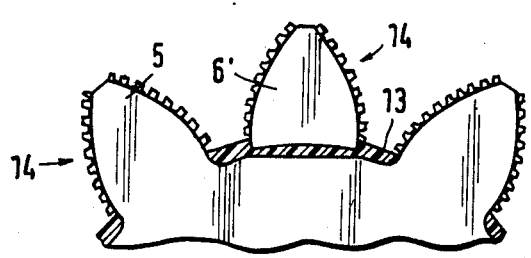
FIG. 4 is a view similar to FIG. 3 which shows a different embodiment of the tool illustrated in FIGS. 2 and 3.

The radial gap between the projecting portions 5' and 6' and the respective base member 4 or 3 which is covered by them can be filled in with an adhesive or a plastic material 12 (FIG. 3). The solidity of this connection is further enhanced if, as shown in FIG. 4, the adhesive or the plastic surrounds the tooth dedendum of each projecting tooth portion 5' or 6' on both sides and in this manner creates a connection 13 to the adjacent teeth 5 and 6 of the other half 1 or 2. The active tooth flanks 14 remain free of the filling material.

The inventive tool is illustrated and described as a gear-shaped tool. In the case of a design as a rack-shaped tool, the teachings in the description and drawing are still applicable, and the same applies in the case of an internally toothed tool. The tool may be helically toothed or straight toothed.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a gear or rack-shaped precision finishing tool for precision finishing of tooth flanks, particularly of hardened gears, including a tooth base member of metal having a coating which includes grains of a hard material such as cubic boron nitride (CBN) or diamond covering each tooth flank of said base member, the improvement comprising wherein said base member of said tool includes two halves on which each second tooth is removed to thereby provide sufficient space for the even application of said coating on the circumferentially facing sides of each of said tooth flanks of the remaining teeth, the remaining teeth each having a pair of oppositely circumferentially facing involute tooth flanks separated at the radial extremity by a land surface, said tooth flanks and land surface extending axially beyond said one side of said base member a distance which is approximately half of their length, said base members being oppositely directed and connected to each other so as to be fixed against relative rotation, wherein said axially projecting teeth of each half are disposed between the teeth of the other half, and wherein connecting means are provided for connecting said two halves together.

2. The gear or rack-shaped tool according to claim 1, wherein gaps exist between said axially projecting teeth of each half and said base member of the other half, said gaps being filled with a plastic or adhesive filling.

3. The gear or rack-shaped tool according to claim 2, wherein said plastic or adhesive filling extends into the base region of the tooth gaps circumferentially between said axially projecting teeth of one half and the teeth of the other half.

* * * * *